(12) United States Patent
Girardeau

(10) Patent No.: US 6,834,864 B2
(45) Date of Patent: Dec. 28, 2004

(54) CHUCK HAVING QUICK CHANGE MECHANISM

(75) Inventor: Samuel G. Girardeau, Greenville, SC (US)

(73) Assignee: Power Tool Holders Incorporated, Christina, DE (US)

(*) Notice: Subject to any disclaimer, the term of this patent is extended or adjusted under 35 U.S.C. 154(b) by 150 days.

(21) Appl. No.: 10/271,450

(22) Filed: Oct. 16, 2002

(65) Prior Publication Data

US 2003/0075880 A1 Apr. 24, 2003

Related U.S. Application Data

(60) Provisional application No. 60/386,187, filed on Oct. 24, 2001.

(51) Int. Cl.[7] ............................................... B23B 31/12
(52) U.S. Cl. ....................................... 279/60; 279/126
(58) Field of Search ............................... 279/35, 36, 37, 279/60, 61, 62, 64, 65, 126, 137

(56) References Cited

U.S. PATENT DOCUMENTS

| | | | |
|---|---|---|---|
| 549,837 A | 11/1895 | Weir | 464/167 |
| 553,531 A | 1/1896 | Long | 464/167 |
| 1,138,465 A | 5/1915 | Fegley et al. | 464/167 |
| 1,195,214 A | 8/1916 | Hapgood | 464/167 |
| 1,209,572 A | 12/1916 | Fegley | 464/167 |
| 1,509,061 A | 9/1924 | Hardwicke | 464/167 |
| 1,653,762 A | 12/1927 | Fegley et al. | 464/167 |
| 1,705,275 A | 3/1929 | Neudeck | 464/167 |
| 2,027,486 A | 1/1936 | Lapointe | 279/74 |
| 2,158,728 A | 5/1939 | Peters | 279/102 |
| 2,336,095 A | 12/1943 | Heding | 279/79 |
| 2,550,871 A | 5/1951 | Sharp | 279/60 |
| 2,806,706 A | 9/1957 | Fitch | 279/79 |
| 2,807,473 A | 9/1957 | Kiehne | 279/82 |
| 2,890,072 A | 6/1959 | Kaman et al. | 287/53 |
| 2,926,020 A | 2/1960 | Dayton et al. | 279/75 |
| 3,219,355 A | 11/1965 | Fujinuma | 279/75 |
| 3,251,605 A | 5/1966 | Ondeck | 279/82 |
| 3,260,541 A | 7/1966 | Sadler et al. | 287/53 |
| 3,367,727 A | 2/1968 | Ward et al. | 306/28 |
| 3,398,965 A | 8/1968 | Cox | 279/30 |

(List continued on next page.)

FOREIGN PATENT DOCUMENTS

| | | | | |
|---|---|---|---|---|
| DE | 3809316 C | * | 5/1989 | ........... B23B/31/04 |
| GB | 2 065 001 A | | 6/1981 | |
| WO | WO 00/71287 A1 | | 11/2000 | |

OTHER PUBLICATIONS

United Kingdom Search Report of Oct. 23, 2001—WO 00/71287.

Patent application Ser. No. 09/852,936, entitled "Chuck with Quick Change" filed May 10, 2001.

U.S. patent application Ser. No. 09/783,698, Huggins et al., filed Feb. 14, 2001.

Primary Examiner—Daniel W. Howell
(74) Attorney, Agent, or Firm—Nelson Mullins; Riley & Scarborough, L.L.P.

(57) ABSTRACT

A chuck for use with a manual or powered driver having a drive shaft, the chuck including a body having a nose section and a tail section, the tail section configured to rotate with a drive shaft of a driver and the nose section having an axial bore formed therein, plurality of jaws disposed within the body in communication with the bore, each of the jaws having a jaw face formed thereon for engagement with a tool shaft, and a visual indicator disposed on the body and including a surface on which is defined a visual indicia that is in operative communication with the jaws so that movement of the jaws to a predetermined position with respect to the bore exposes the indicia to view from outside the chuck and so that movement of the jaws from the predetermined position blocks the indicia from view from outside the chuck.

33 Claims, 5 Drawing Sheets

U.S. PATENT DOCUMENTS

| | | | |
|---|---|---|---|
| 3,521,895 A | 7/1970 | Smith | 279/22 |
| 3,529,842 A | 9/1970 | Benjamin et al. | 279/30 |
| 3,549,160 A | 12/1970 | Etzkorn | 279/97 |
| 3,582,097 A | 6/1971 | Elliott | 279/61 |
| 3,583,715 A | 6/1971 | Jahrl | 279/75 |
| 3,658,351 A | 4/1972 | Benjamin et al. | 279/1 B |
| 3,693,484 A | 9/1972 | Sanderson, Jr. | 81/90 C |
| 3,707,303 A | 12/1972 | Petri | 287/20.3 |
| 3,726,533 A | 4/1973 | Lafferty, Sr. | 279/97 |
| 3,734,516 A | 5/1973 | Smith | 279/75 |
| 3,735,993 A | 5/1973 | Seibert | 279/1 B |
| 3,767,218 A | 10/1973 | Linthicum et al. | 279/75 |
| 3,861,693 A | 1/1975 | Huber | 279/61 |
| 3,893,677 A | 7/1975 | Smith | 279/75 |
| 3,924,493 A | 12/1975 | Penner | 81/177 G |
| 3,929,343 A | 12/1975 | Wanner et al. | 279/1 B |
| 3,945,653 A | 3/1976 | Falchle | 279/97 |
| 4,002,347 A | 1/1977 | Wanner et al. | 279/19.3 |
| 4,041,729 A | 8/1977 | Bilz | 64/29 |
| 4,107,949 A | 8/1978 | Wanner et al. | 64/9 A |
| 4,131,165 A | 12/1978 | Wanner et al. | 173/48 |
| 4,184,692 A | 1/1980 | Benson et al. | 279/75 |
| 4,209,182 A | 6/1980 | Sheldon | 279/75 |
| 4,231,581 A | 11/1980 | Benedict | 279/19.4 |
| 4,234,277 A | 11/1980 | Benson et al. | 408/226 |
| 4,287,923 A | 9/1981 | Hornung | 81/429 |
| 4,290,617 A | 9/1981 | Yoshida | 279/75 |
| 4,309,042 A | 1/1982 | Fauth et al. | 279/75 |
| 4,349,929 A | 9/1982 | Dewey | 7/158 |
| 4,378,053 A | 3/1983 | Simpson | 173/13 |
| 4,390,311 A | 6/1983 | Kuhlmann | 409/232 |
| 4,407,615 A | 10/1983 | Kuhlmann | 408/239 |
| RE31,755 E | 12/1984 | Wanner et al. | 464/167 |
| 4,489,525 A | 12/1984 | Heck | 51/170 R |
| 4,491,444 A | 1/1985 | Rumpp et al. | 409/234 |
| 4,573,839 A | 3/1986 | Finnegan | 408/239 R |
| 4,594,036 A | 6/1986 | Hogenhout | 408/240 |
| 4,626,152 A | 12/1986 | Palm | 409/232 |
| 4,629,375 A | 12/1986 | Lieser | 408/239 R |
| 4,644,831 A | 2/1987 | Yang | 81/125 |
| 4,688,975 A | 8/1987 | Palm | 409/232 |
| 4,692,073 A | 9/1987 | Martindell | 408/239 A |
| 4,726,270 A | 2/1988 | Lucas | 83/13 |
| 4,740,122 A | 4/1988 | Glaser | 409/232 |
| 4,775,159 A | 10/1988 | Manschitz | 279/19.3 |
| 4,775,269 A | 10/1988 | Brix | 408/239 R |
| 4,787,278 A | 11/1988 | Bononi | 81/438 |
| 4,824,298 A | 4/1989 | Lippacher et al. | 408/240 |
| 4,848,779 A | 7/1989 | Wheeler et al. | 279/60 |
| 4,858,939 A | 8/1989 | Riggs | 279/75 |
| 4,900,202 A | 2/1990 | Wienhold | 408/240 |
| 4,934,226 A | 6/1990 | Dacey, Jr. | 81/125 |
| 4,960,344 A | 10/1990 | Geisthoff et al. | 403/316 |
| 5,011,344 A | 4/1991 | Johnson | 408/240 |
| 5,013,194 A | 5/1991 | Wienhold | 408/240 |
| 5,016,892 A | 5/1991 | Lafforgue et al. | 279/82 |
| 5,028,057 A | 7/1991 | Wanner | 279/19.3 |
| 5,062,749 A | 11/1991 | Sheets | 408/240 |
| 5,076,371 A | 12/1991 | Obermeier et al. | 173/104 |
| 5,170,851 A | 12/1992 | Kress et al. | 173/29 |
| 5,188,378 A | 2/1993 | Erlenkeuser | 279/22 |
| 5,199,833 A | 4/1993 | Fehrle et al. | 408/239 R |
| 5,301,961 A | 4/1994 | Wozar | 279/46.2 |
| 5,346,453 A | 9/1994 | Rivera-Bottzeck | 483/1 |
| 5,348,318 A | 9/1994 | Steadings et al. | 279/62 |
| 5,354,075 A | 10/1994 | Marik et al. | 279/72 |
| 5,398,946 A | 3/1995 | Quiring | 279/30 |
| 5,417,527 A | 5/1995 | Wienhold | 408/239 R |
| 5,437,465 A | 8/1995 | Vogele et al. | 279/22 |
| 5,447,397 A | 9/1995 | Asano | 408/59 |
| 5,464,229 A | 11/1995 | Salpaka | 279/30 |
| 5,470,084 A | 11/1995 | Reibetanz et al. | 279/19.3 |
| 5,481,949 A | 1/1996 | Yen | 81/438 |
| 5,531,278 A | 7/1996 | Lin | 173/176 |
| 5,550,416 A | 8/1996 | Fanchang et al. | 310/83 |
| 5,558,478 A | 9/1996 | Odendahl et al. | 408/226 |
| 5,573,255 A | 11/1996 | Salpaka | 279/75 |
| 5,577,743 A | 11/1996 | Kanaan et al. | 279/72 |
| 5,603,516 A | 2/1997 | Neumaier | 279/19.5 |
| 5,669,730 A | 9/1997 | Bidaux | 403/325 |
| 5,678,961 A | 10/1997 | Fleege et al. | 408/239 A |
| 5,700,018 A | 12/1997 | Bongers-Ambrosius et al. | 279/19.4 |
| 5,709,391 A | 1/1998 | Arakawa et al. | 279/19.4 |
| 5,709,393 A | 1/1998 | von Keudell et al. | 279/97 |
| 5,722,805 A | 3/1998 | Giffin | 408/239 R |
| 5,738,469 A | 4/1998 | Hsu | 408/139 |
| 5,755,448 A | 5/1998 | Kanaan et al. | 279/75 |
| 5,810,366 A | 9/1998 | Montjoy et al. | 279/43 |
| 5,813,296 A | 9/1998 | Hoff et al. | 81/177.85 |
| 5,819,607 A * | 10/1998 | Carnesi | 81/128 |
| 5,820,136 A | 10/1998 | Han et al. | 279/131 |
| 5,826,888 A | 10/1998 | Weaver et al. | 279/23.1 |
| 5,833,405 A | 11/1998 | Nielsen | 408/226 |
| 5,868,209 A | 2/1999 | Wierspecker et al. | 173/213 |
| 5,881,614 A | 3/1999 | Cheng-Tsan | 81/438 |
| 5,893,685 A | 4/1999 | Olson et al. | 408/35 |
| 5,903,983 A | 5/1999 | Jungmann et al. | 30/392 |
| 5,906,378 A | 5/1999 | Nordquist | 279/4.06 |
| 5,921,562 A | 7/1999 | Robison | 279/128 |
| 5,921,563 A | 7/1999 | Huggins et al. | 279/131 |
| 5,934,384 A | 8/1999 | Wang | 173/132 |
| 5,947,484 A | 9/1999 | Huggins et al. | 279/43.4 |
| 5,951,026 A | 9/1999 | Harman, Jr. et al. | 279/143 |
| 5,954,347 A | 9/1999 | Buck et al. | 279/20 |
| 5,975,815 A | 11/1999 | Zierpka et al. | 408/226 |
| 5,984,596 A | 11/1999 | Fehrle et al. | 408/226 |
| 5,988,957 A | 11/1999 | Wheeler | 408/239 R |
| 6,007,277 A | 12/1999 | Olson et al. | 408/35 |
| 6,047,971 A | 4/2000 | Harman, Jr. et al. | 279/143 |
| 6,053,675 A | 4/2000 | Holland et al. | 408/239 R |
| 6,059,296 A | 5/2000 | Baeder | 279/20 |
| 6,070,675 A | 6/2000 | Mayer et al. | 173/48 |
| 6,079,716 A | 6/2000 | Harman, Jr. et al. | 279/75 |
| 6,089,798 A | 7/2000 | Wierspecker et al. | 408/226 |
| 6,092,814 A | 7/2000 | Kageler | 279/19.4 |
| 6,126,370 A | 10/2000 | Wheeler et al. | 408/239 R |
| 6,135,462 A | 10/2000 | Robison | 279/137 |
| 6,139,241 A | 10/2000 | Craig et al. | 414/287 |
| 6,193,242 B1 | 2/2001 | Robison | 279/137 |
| 6,533,291 B2 * | 3/2003 | Huggins et al. | 279/29 |
| 6,688,610 B2 * | 2/2004 | Huggins et al. | 279/22 |

* cited by examiner

CHUCK HAVING QUICK CHANGE MECHANISM

CROSS REFERENCE TO RELATED APPLICATION

The present application claims the benefit of U.S. Provisional Patent Application No. 60/386,187, filed Oct. 24, 2001.

BACKGROUND OF THE INVENTION

The present invention relates generally to chucks for hand, electric or pneumatic power drivers and particularly to quick change chucks.

Electric and pneumatic tool drivers are well known. Although twist drills are the most common tools on such drivers, the tools may also comprise screw drivers, nut drivers, burrs, mounted grinding stones and other cutting or abrading tools. Since the tool shanks vary in diameter or have a polygonal cross-section, the device usually has an adjustable chuck. The chuck may be attached to the driver spindle by a threaded or tapered bore. A variety of chucks for both hand and power drivers have been developed in the art.

In an oblique jawed chuck, a chuck body includes three passageways disposed approximately 120 degrees apart from each other. The passageways are configured so that their center lines meet at a point along the chuck's central axis at a point typically forward of the chuck. The passageways constrain three jaws that are moveable in the passageways to grip a cylindrical or polygonal tool shank displaced approximately along the chuck's center axis. The chuck includes a nut that rotates about the chuck center and that engages threads on the jaws so that rotation of the nut moves the jaws in either direction within the passageways. The body is attached to the spindle of a driver and is configured so that rotation of the body in one direction with respect to the nut forces the jaws into gripping relationship with the tool shank, while rotation in the opposite direction releases the gripping relationship. The chuck may be operated by a chuck key, or the sleeve may be rotated by hand in a keyless configuration. An example of a keyless chuck is disclosed in U.S. Pat. No. 5,125,673, which is commonly assigned to the present Assignee and the entire disclosure of which is incorporated by reference herein. Various configurations of keyless chucks are known in the art and are desirable in a variety of applications.

SUMMARY OF THE INVENTION

The present invention recognizes and addresses the foregoing considerations, and others, of prior art constructions and methods.

Accordingly, it is an object of the present invention to provide an improved chuck for a tool driver.

This and other objects may be achieved by a chuck for use with a manual or powered driver having a drive shaft. The chuck includes a generally cylindrical body member having a nose section and a tail section. The tail section is configured to mate with the drive shaft of the driver, and the nose section has an axial bore formed therein. A plurality of jaws are disposed radially reciprocally within the body in communication with the bore. Each of the jaws has a jaw face formed thereon for engagement with the tool. An annular nut is axially movably disposed about the body in driving engagement with the jaws so that axial movement of the nut with respect to the body drives the jaws toward and away from the axial bore, depending on the direction of the axial movement. The nut defines a threaded outer circumferential surface. A generally cylindrical sleeve is rotatably mounted about the body and defines a threaded inner circumferential surface engaging the threaded outer surface of the nut so that relative rotation between the nut and the sleeve moves the nut axially with respect to the body. The nut and the body tail section are rotationally coupled by an axially aligned, with respect to the chuck body, slot defined on one of the nut and the tail section and an axially aligned rib defined on the other of the nut and the tail section and received by the slot. A first detent is formed in the nut and engages a catch formed on the inner surface of the sleeve between the threads.

A second detent extends radially into the bore located in the body. The second detent is releasable in a radially outward direction. An elongated tool shaft has a polygonal cross section and defines a circumferential groove. Upon insertion of the tool shaft into the bore so that the groove is aligned with the second detent, the second detent engages the groove and axially retains the tool shaft. When the jaws are moved to a predetermined location, the jaw faces engage flat sides of the tool shaft rotationally locking the tool in place.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof to one of ordinary skill in the art, is set forth more particularly in the remainder of the specification, which makes reference to the accompanying figures, in which.

Figure 1:
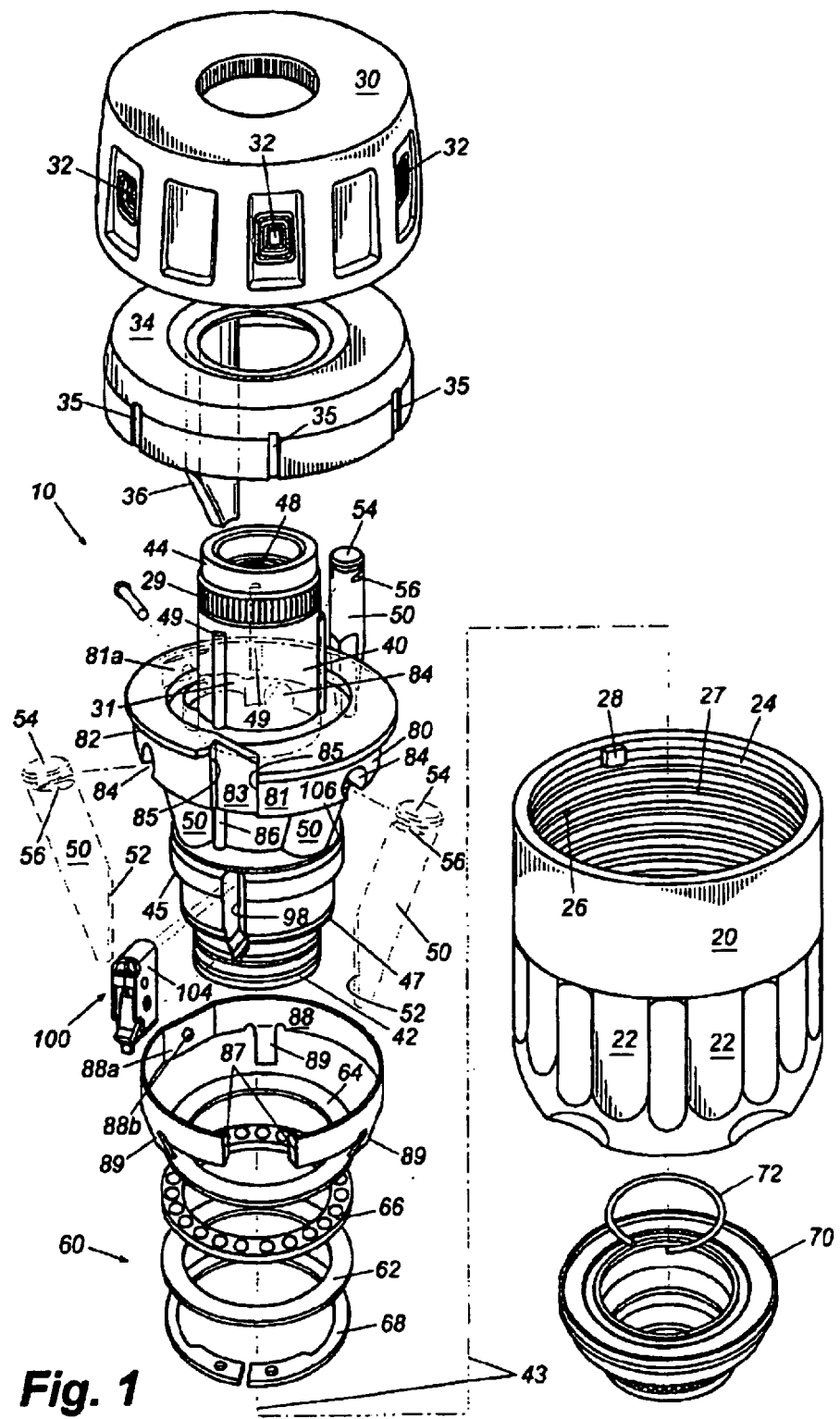
FIG. 1 is an exploded view of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
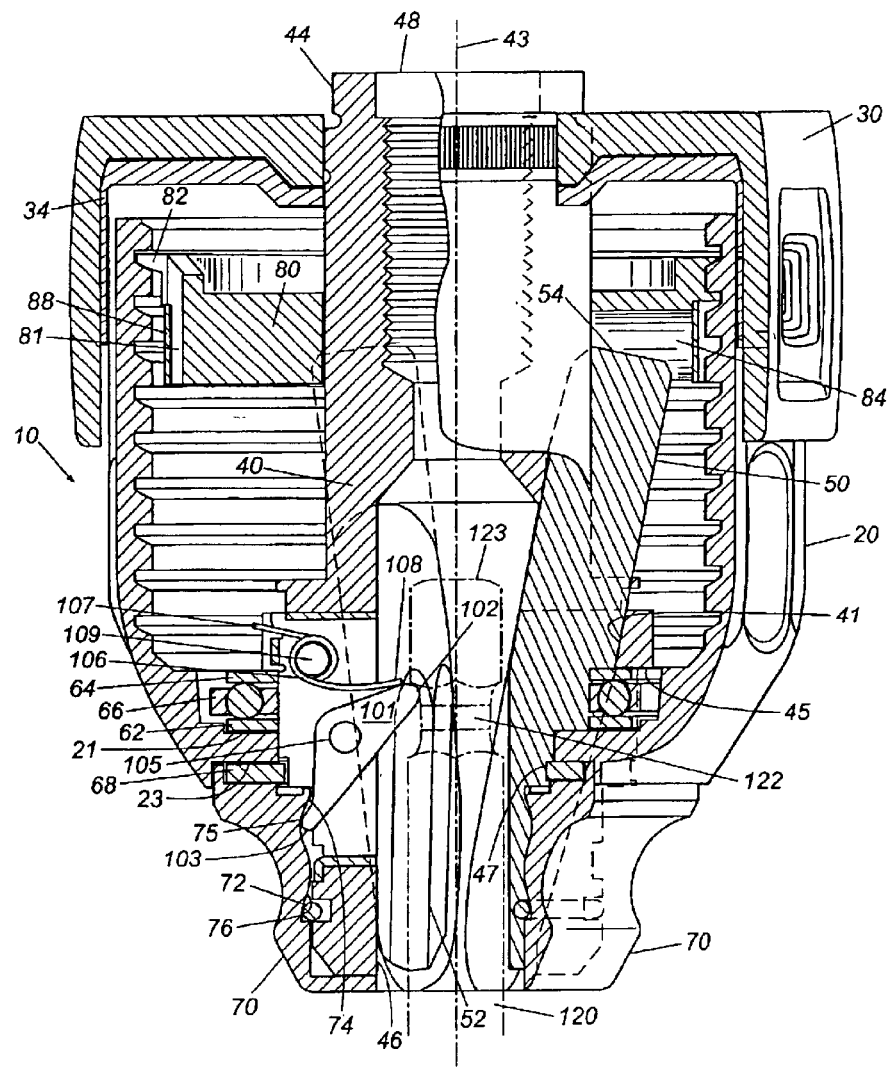
FIG. 2 is a cutaway plan view of the chuck as in FIG. 1.
Figure 3:
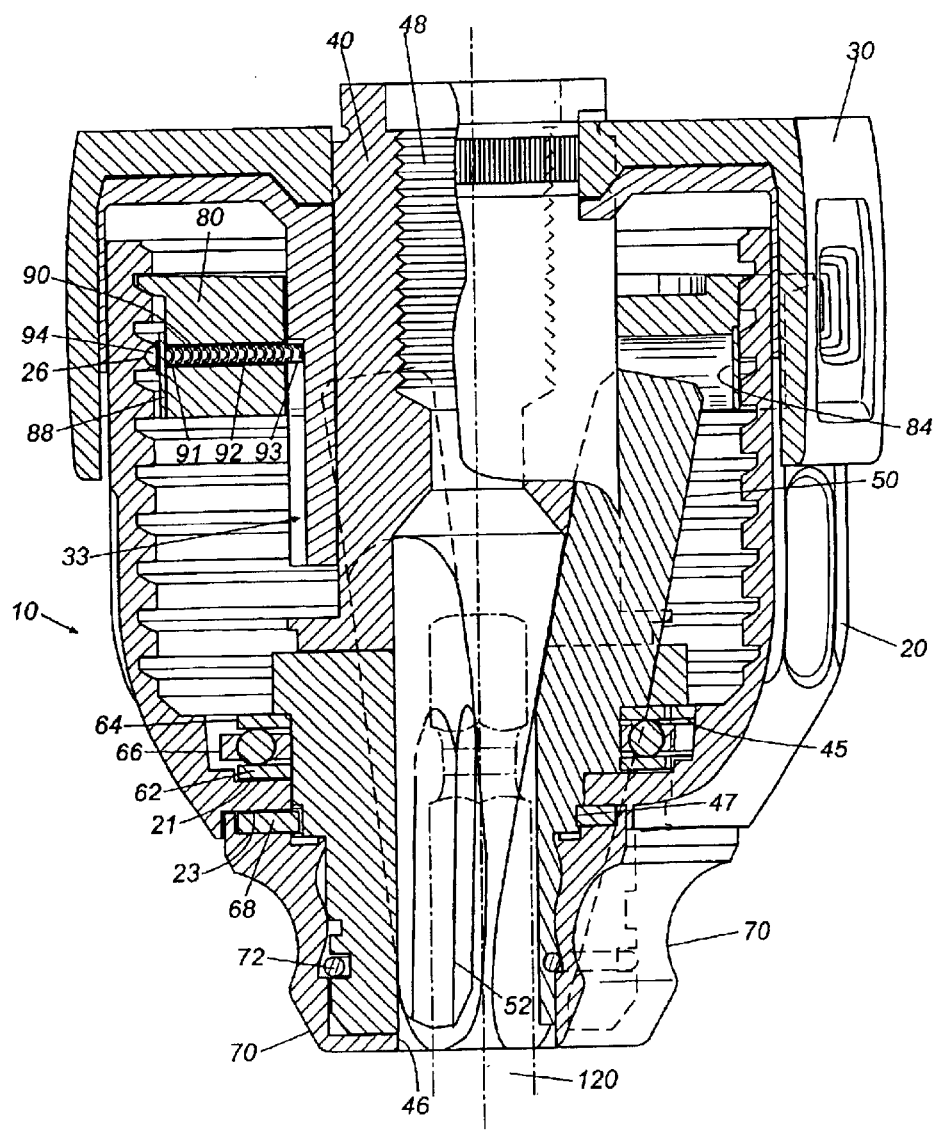
FIG. 3 is cutaway plan view of the chuck as in FIG. 1.

Referring to FIGS. 1 to 3, a chuck 10 in accordance with one embodiment of the present invention includes a front sleeve 20, a rear sleeve 30, a body 40, and jaws 50. Body 40 is generally cylindrical in shape and comprises a nose section 42 and a tail section 44. An axial bore 46 is formed in nose section 42 and is somewhat larger than the largest tool shank that chuck 10 is designed to accommodate. Tail section 44 defines a threaded bore 48 and is of a standard size to mate with the drive shaft of a powered or hand driver (not shown). Bores 46 and 48 may communicate at a central region of body 40. While a threaded bore 48 is illustrated, such bore could be replaced with a tapered bore of a standard size to mate with a tapered drive shaft or could be made integrally with the drive shaft.

Passageways 41 are formed in body 40 to accommodate each jaw. Preferably, three jaws 50 are employed, and each jaw is separated from an adjacent jaw by an arc of approximately 120 degrees. The axes of passageways 41 and jaws 50 are angled with respect to chuck axis 43 but intersect chuck axis 43 at a common point. Each jaw 50 has a tool engaging face 52, which is generally parallel to chuck body axis 43.

Body 40 defines a shoulder 45 against which is received a bearing assembly 60 comprised of a pair of washers 62 and 64 on either side of a caged ball bearing ring 66. Forward washer 62 bears in an axially forward direction against a shoulder 21 of sleeve 20, and rearward axial movement of sleeve 20 on body 40 is prevented by shoulder 45 through bearing assembly 60. Bearing assembly 60 may comprise any suitable construction, for example of the type described in U.S. Pat. No. 5,348,318, incorporated by reference herein, that facilitates relative rotation between sleeve 20 and the body. In contrast to sleeve 20, rear sleeve 30 is rotationally fixed to body 40. In the illustrated embodiment, the rear sleeve is pressed onto the body tail section over knurling 29 formed about the body, but it should be understood that the rear sleeve may be attached to the body in any suitable manner.

A C-clip 68 is received in an annular groove 47 in body 40 to secure sleeve 20 and bearing assembly 60 in the axially forward direction. C-clip 68 is located adjacent a front face 23 of sleeve 20. A nose piece 70 is slidably received over nose section 42 and is yieldably axially restrained by a compressible C-ring 72 as described in more detail below.

The outer circumferential surface of sleeve 20 may be knurled or may be provided with longitudinal ribs 22 or other protrusions to enable an operator to securely grip the sleeve. Sleeve 20 may be fabricated from a structural plastic such as polycarbonate, a filled polypropylene, for example glass-filled polypropylene, or a blend of structural plastic materials. Other composite materials, for example, such as graphite-filled polymerics, could also be suitable in certain environments. Further, sleeve 20 may be constructed from suitable metals, such as steel. As should be appreciated by one skilled in the art, the materials from which chuck 10 is fabricated may depend on the end use of the power driver, and the above are provided by way of example only.

An interior surface of sleeve 20 defines female threads 24. Threads 24 are a modified square thread formation. It should be understood, however, that any suitable thread shape or formation may be employed, for example including a modified buttress thread. The forward faces of threads 24 may be angled, as shown in FIGS. 2 and 3, or may form straight or curved surfaces. Furthermore, threads 24 may define any suitable pitch, for example an eight pitch configuration along the length of sleeve 20. A recess 26 is formed on the inner surface of sleeve 20 in a land 27 between two adjacent female threads. Recess 26 is used to set jaws 50 at a predetermined location and is explained in greater detail below.

A driver, in this embodiment a nut 80, is slidably received over chuck body 40 and has a male thread 82 extending about the nut's outer circumferential surface. Thread 82 has the same pitch as thread 24 so that when thread 82 is received by thread 24, relative rotation between sleeve 20 and nut 80 moves nut 80 axially within sleeve 20. In particular, where nut 80 is molded, thread 82 may have sloped sides, for example at an approximately 5 degree slope, extending from the outer surface of nut 80 to the outer surface of thread 82.

Nut 80 includes three equiangularly spaced apart slots 84 extending axially through nut 80 that receive respective end sections 54 of jaws 50. Slots 84 are generally cylindrical in shape, and end sections 54 have cut-outs 56 on either side of each jaw so that end sections 54 are radially slidable within nut 80. The interaction of slots 84 and end sections 54 axially secures jaws 50 to nut 80, so that jaws 50 travel with nut 80 as it moves axially on chuck body 40, and prevents rotation of jaws 50 about their axes. It should be understood that jaws 50 may be secured to nut 80 in any suitable manner. For example, nut 80 may include slots that extend entirely axially through nut 80, and jaw ends 54 may extend through slots 84 and rearward of nut 80. In such an embodiment, a garter spring may extend around all three jaw ends 54 to retain jaws 50 axially to nut 80.

Since jaws 50 are received in jaw passageways 41, the connection between jaw ends 54 and slots 84 prevents nut 80 from rotating about body 40. Nut 80 is also rotationally coupled to body 40 by a slot/key arrangement between three ribs 49 extending axially along tail section 44 and three respective slots that extend axially along the inner circumference of nut 80 and that slidably receive respective ribs 49. Thus, even though nut 80 and body 40 are also rotationally coupled by jaws 50 in jaw passageways 41, the slot/key formation provides further rotational stabilization between the two components. It should be understood that the particular shapes of slots and ribs may vary and that slots or ribs may be defined on either nut 80 or chuck body 40.

Because nut 80 is rotationally coupled to chuck body 40, rotation of sleeve 20 with respect to body 40 moves nut 80 axially with respect to chuck axis 43 by the cooperation between threads 24 and 82. Depending on the rotational direction of sleeve 20 relative to nut 80, jaws 50 move axially forward or backward relative to body 40 to an opened or closed position. As jaws 50 move forward toward a closed position, jaw ends 54 move radially inward within nut slots 84. Conversely, jaw ends 54 move radially outward toward sleeve 20 as nut 80 moves rearwardly in the opening direction.

A guard ring 88 is received on an outer shelf surface 81 of nut 80 and covers the openings to slots 84, thereby preventing jaw ends 54 from extending radially outward of slots 84 in an extreme open position and interfering with sleeve thread 24. Guard ring 88 includes three finger portions 89 that extend axially forward, and radially inward, from the openings at generally the same angle with respect to chuck axis 43 as defined by jaws 50. Guard ring 88 is maintained in the correct rotational position by flanges 87 that grip opposing surfaces 85 of an axial slot 83 extending through the outer surface of nut 80.

Referring to FIGS. 1 and 4–6, it can be seen that nut 80 also has a flat shelf surface 81a where a bore 90 is defined radially therethrough. In order to properly receive guard ring 88, guard ring 88 also contains a flat surface 88a that mates to flat shelf surface 81a. A bore 88b formed in flat portion 88a aligns with nut radial bore 90. The opening of bore 90 is centered in flat shelf surface 81a and houses a detent that aides chuck 10 in configuring jaws 50 to rotationally lock a tool 120 in chuck 10.

Referring also to FIG. 3, the detent includes a tubular casing 91, a spring 92 within casing 91, and a ball 94 biased by the spring radially outward from casing 91. The rear end of spring 92 engages an enclosed end 93 of casing 91 and traverses a channel 33 formed in a finger 36 of a lock indicator ring 34. Lock indicator ring 34 is rotatably mounted within rear sleeve 30 and cooperates with multiple openings 32 equally spaced about the circumference of the rear sleeve to visually notify the user that the jaws are in a predetermined desired position, as described in more detail below.

Figure 4:
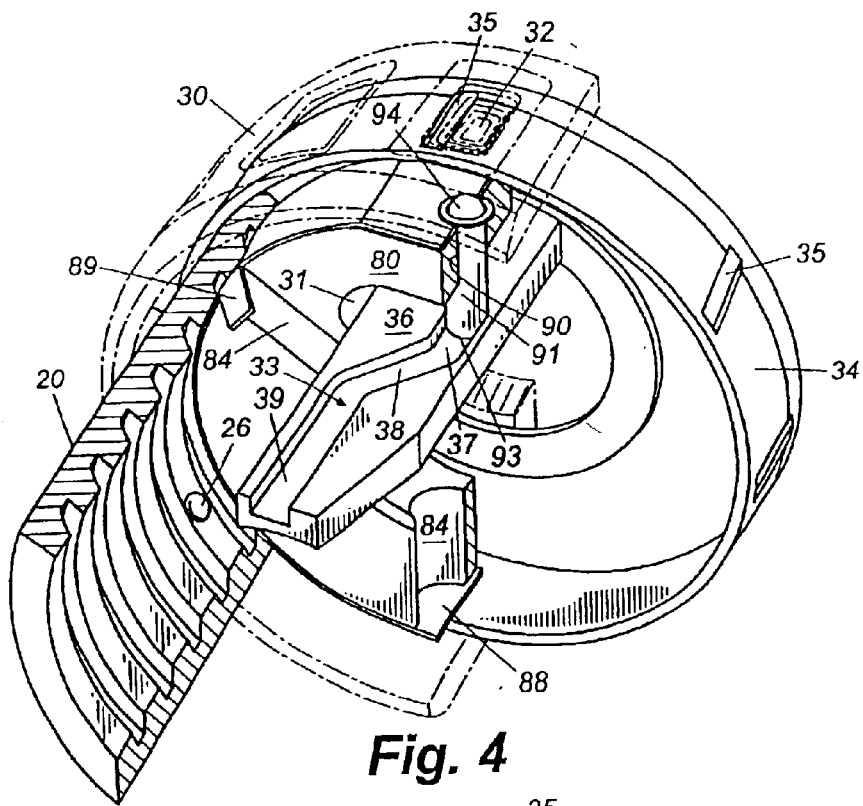
FIG. 4 to 6 are cutaway perspective views of a visual indicator and detent of the chuck as in FIG. 1.
Figure 5:
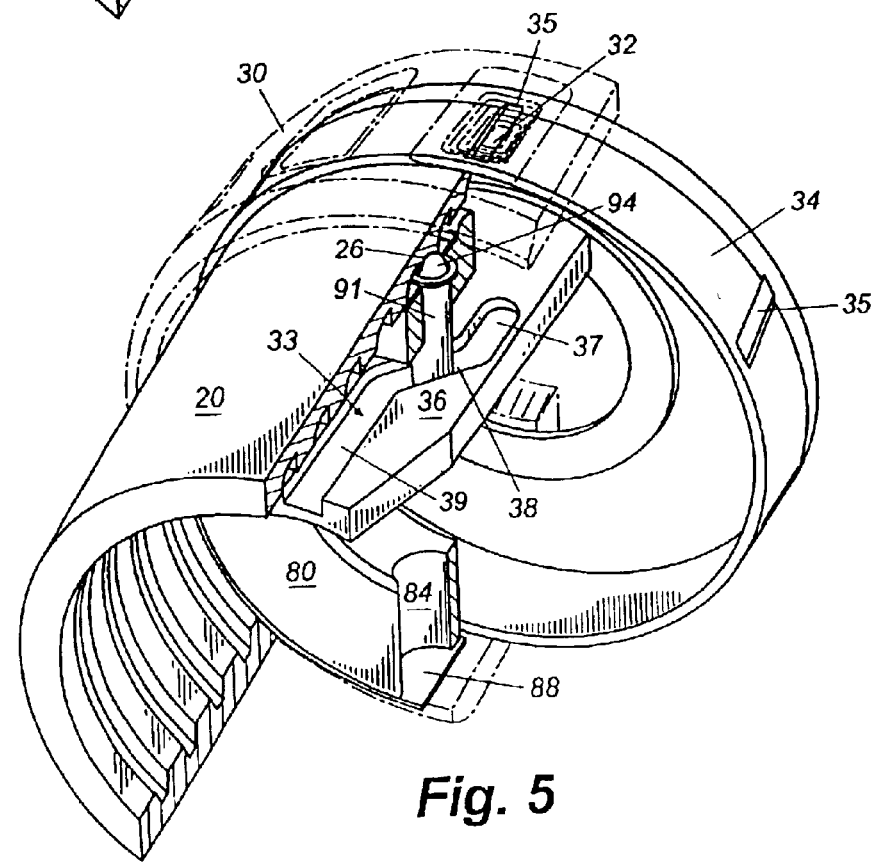
Figure 6:
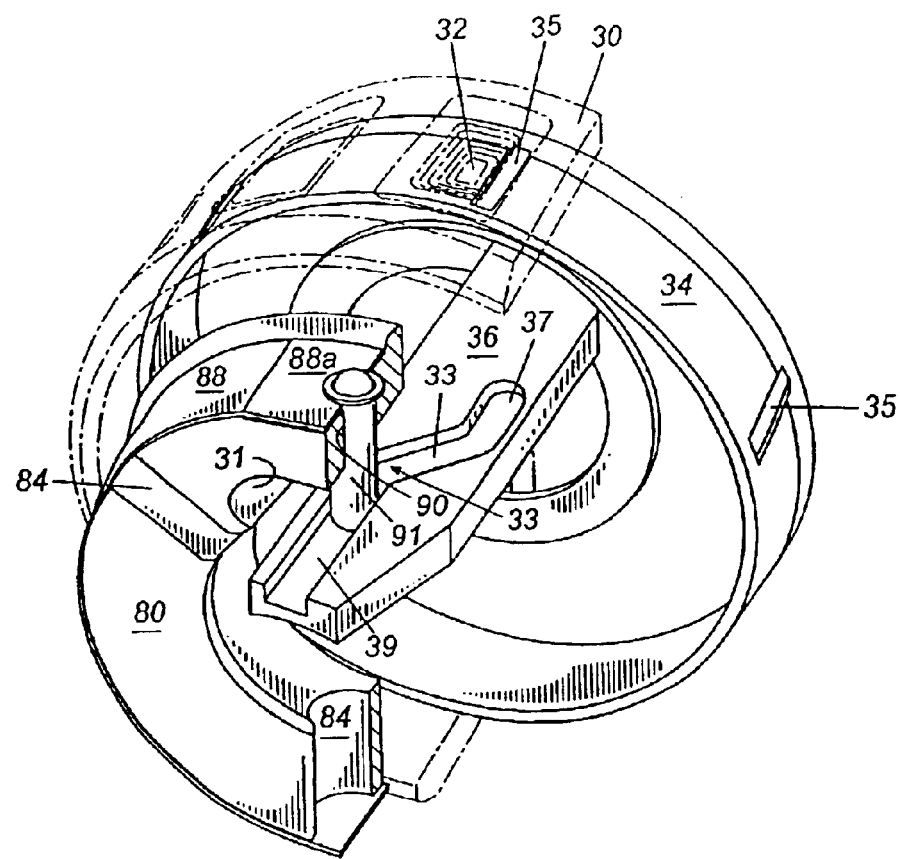

Channel 33 has three distinct regions: an upper channel 37, a mid channel 38, and a lower channel 39. Upper channel 37 and lower channel 39 run parallel to bore axis 43 and are slightly offset from each other by mid channel 38, which is formed at an angle from bore axis 43 and in continuous communication with upper channel 37 and lower channel 39, as shown in FIGS. 4–6. Lock indicator ring 34 also defines indicia 35 equally spaced about its circumference. Indicia 35 can be formed from colored recesses, bumps, circles, etc., as well as areas of distinct shading, cross-hatching or other patterning, texture, or other indicator that is visually distinct from the areas to either side of the indicia on the circumferential surface of lock ring 34. Lock indicator ring 34 is rotatably coupled within rear sleeve 30 such that indicia 35 align with openings 32 as lock indicator ring 34 is rotated within rear sleeve 30.

When installed on the body, rear sleeve 30 and lock indicator ring 34 are positioned so that finger 36 fits between nut 80 and body 40 through a channel 31 formed in the inner circumference of nut 80. Bore 90 opens into the center of channel 31 so that rear end 93 of casing 91 extends into channel 33 in finger 36. Channel 31 defines a width larger than the width of finger 36, so that finger 36 and lock indicator ring 34 can rotate about the chuck axis over a limited arc with respect to nut 80 and, therefore, with respect to body 40 and rear sleeve 30. The difference between the widths of channel 31 and finger 36 (i.e. the range of rotational movement of ring 34 with respect to the rear sleeve) may vary but should be large enough to permit movement of indicia 35 into and out of the operator's view in openings 32. As described below, this movement is controlled by the position of rear end 93 in channel 33 in finger 36 as nut 80 moves axially over body 40.

In operation, as sleeve 20 rotates about nut 80, ball 94 rides on lands 27 between the grooves of threads 24. Depression 26 formed in land 27 receives ball 94 when tool engaging surfaces 52 of jaws 50 define a predefined diameter. When tool engaging surfaces 52 are in this predetermined position, the diameter is slightly less than the cross width of a tool (preferably a multi-sided tool) that chuck 10 is to receive. For example, the diameter is slightly less than one-quarter inch where the width of the expected tool shafts is one-quarter inch. Ball 94 makes a clicking sound when entering depression 26 and slightly inhibits rotation of sleeve 20. This notifies the user that jaws 50 are in the predetermined position to receive the tool shank. In addition, lock indicator ring 34 provides a visual indicator regarding whether the jaws have reached the predetermined position. The indicator is controlled through operation of sleeve 20, which moves nut 80 axially relative to sleeve 20 and body 40. As nut 80 moves axially on the body, rear end 93 of casing 91 traverses channel 33 as seen in FIGS. 4–6. Keeping in mind that nut 80 is rotationally fixed with respect to body 40 and rear sleeve 30, casing 91 does not rotate about the chuck axis as it moves up and down the chuck body with the nut. Thus, the casing pushes finger 36 slightly clockwise or counterclockwise about the chuck axis as it traverses channel 31, depending on the direction of its movement.

For example, in FIG. 4, casing 91 is located in upper channel 37, and indicia 35 are just offset from their corresponding openings 32 in the counterclockwise direction. As sleeve 20 is rotated clockwise, nut 80 moves axially forward along body 40 causing jaws 50 to move into bore 46 (FIG. 3) toward the predetermined position. As casing 91 moves up the body with the nut, and referring also to FIG. 5, ball 94 eventually engages depression 26, thereby causing an audible click and slight resistance to notify the user that the jaws have reached the predetermined position. By this point, casing 91 has moved from the upper channel to the mid channel. Its movement to the angled mid channel forces the lock indicator ring to rotate slightly in the clockwise direction, thereby causing indicia 35 to align with their corresponding openings 32. This creates a visual indication to the user that the predetermined position has been reached. If the user continues to rotate sleeve 20 in the clockwise direction, ball 94 moves out of depression 26, and casing 91 moves through channel 33 into lower channel 39. This further rotates lock indicator ring 34 and moves indicia 35 out of alignment with openings 32, as shown in FIG. 6.

A stop 28 may be provided at the rear edge of thread 24 so that a rear edge of thread 82 abuts stop 28 when (i) jaws 50 reach a fully open position or (ii) casing 91 reaches the upper end of upper channel 37. A similar stop (not shown) may be provided at the front end of thread 24 to stop a forward edge of thread 82 to prevent (i) jaws 50 from binding in the fully closed position when there is no tool in bore 46 or (ii) casing 91 from reaching the lower end of lower channel 39.

By rotating sleeve 20, the user may grip and release a cylindrical or polygonal shaped tool shank through the jaws alone. That is, the user may insert a tool shank into bore 46 (FIG. 3) and rotate sleeve 20 so that nut 80 drives the jaws down onto the shank and so that the jaws tighten onto the shank, regardless of the engagement of detent ball 94 in recess 26 and the activation of the visual indicator along the way. On the other hand, the operator may use these devices in locating the jaws to receive a tool shank of a predetermined size. For example, there the chuck is configured to receive a quarter inch polygonal (e.g. hexagonal) bit in this manner, the ball detent and visual indicator may locate the position where the jaws' engaging surface define a diameter slightly less than one quarter inch. The difference in diameter accounts for any tolerances in the chuck, and as the bit is pushed into the chuck bore, the bit's flat sides push the jaws slightly back against those tolerances.

Once the polygonal bit is pushed into the bore, the jaws secure the bit against rotation but may not necessarily provide sufficient axial restraint without further tightening. To avoid the need for hand-tightening through additional rotation of sleeve 20, the jaws my be part of a quick change mechanism that includes a detent that axially restrains the bit in the chuck bore.

Referring to FIGS. 1 and 2, a detent 100 includes a lever 101 that engages a catch in a tool shaft 120, for example an annular groove 122. Lever 101 pivots about a pin 105 within a cartridge 104, which is pressed into an axial slot 98 extending radially through body 40 and opening into bore 46. A spring 106 winds about a pin 109 and has a first end 107 resting against a rearward edge of cartridge 104 and a second edge 108 that rests against a rearward end 102 of lever 101 so that spring 106 biases rearward end 102 into bore 46. Due to the pivotal connection of lever 101 at pin 105, a forward end 103 of lever 101 is biased radially outward against an inner surface 75 of nose piece 70.

When tool shank 120 of sufficient cross-sectional diameter is inserted into bore 46, a leading edge 123 of tool shank 120 engages rearward end 102 and pushes rearward end 102 radially outward against the bias of spring 106 so that rearward end 102 passes over tool shank 120 as tool shank 120 is inserted into bore 46. When shank 120 passes to a sufficient depth into bore 46, spring 106 pushes rearward end 102 into annular groove 122. If tool shank 120 is pulled axially forward, groove 122 engages rearward end 102, tending to pivot lever 101 about pin 105. This rotation is, however, prevented by the engagement of forward end 103 against the inner surface 75 of nosepiece 70. Thus, detent 100 retains tool shank 120 axially in bore 46.

Once shank 120 is inserted into bore 46 and locked into place, it may be released by pulling nosepiece 70 forward so that a cam surface 74 at the rear of the nosepiece pushes forward end 103 of lever 101 radially inward within cartridge 104. This pivots lever 101 about pin 105 so that rearward end 102 moves radially outward out of groove 122, allowing tool shank 120 to be removed from chuck 10.

Lever 101 also assists in retaining nosepiece 70 on body 40. Cam surface 74 is sloped such that forward end 103 of lever 101, which is biased into inner surface 75 by spring 106, tends to urge nosepiece 70 axially rearward into its position shown in FIG. 2. Furthermore, C-ring 72 is biased radially outward against a second cam surface 76. When nosepiece 70 is pulled forward, ring 72 pushes outward against cam surface 76 and, when the operator released nosepiece 70, urges nosepiece 70 axially rearward to its position as shown in FIG. 2.

While one embodiment of the present invention has been described above, it should be understood that any and all equivalent realizations of the present invention are included within the scope and spirit thereof. Thus, the depicted embodiment is presented by way of example only and is not intended as a limitation of the present invention. For example, either of the audible and visual indicators may be used without the other and/or without the front detent. Therefore, it is contemplated that any and all such embodiments are included in the present invention as may fall within the literal or equivalent scope of the appended claims.

What is claimed is:

1. A chuck for use with a manual or powered driver having a drive shaft, said chuck comprising:
   a. a generally cylindrical body having a nose section and a tail section, said tail section being configured to rotate with the drive shaft of the driver and said nose section having an axial bore formed therein;
   b. a plurality of jaws disposed axially and radially reciprocally within said body in communication with said bore, each of said jaws having a jaw face formed thereon for engagement with a tool shaft; and
   c. a visual indicator disposed on said body and including a surface on which is defined a visual indicia that is in operative communication with said jaws so that movement of said jaws to a predetermined position with respect to said bore exposes said indicia to view from outside the chuck and so that movement of said jaws from said predetermined position blocks said indicia from view from outside the chuck.

2. The chuck as in claim 1,
   including a first sleeve disposed with respect to said indicator so that when said first sleeve and said indicator are in a first relative position to each other, said first sleeve exposes said indicia to view from outside the chuck and so that when said sleeve and said indicator are in a second relative position, said sleeve blocks said indicia from view from outside the chuck,
   wherein one of said first sleeve and said indicator is movable with respect to the other of said first sleeve and said indicator between said first relative position and said second relative position, and
   wherein said jaws are in driving communication with said one of said first sleeve and said indicator so that said movement of said jaws to said predetermined position moves said one of said first sleeve and said indicator to said first relative position and so that said movement of said jaws out of said predetermined position moves said one of said first sleeve and said indicator to said second relative position.

3. The chuck as in claim 2, including a nut disposed on said body in driving engagement with said jaws so that movement of said nut with respect to said body moves said jaws into and out of said predetermined position.

4. The chuck as in claim 3, wherein said nut is in driving communication with said one of said first sleeve and said indicator so that said jaws are in said driving communication with said one of said first sleeve and said indicator through said nut.

5. The chuck as in claim 4, wherein said nut is axially movable on said body so that axial movement of said nut drives said jaws toward and away from said axial bore.

6. The chuck as in claim 4, wherein said first sleeve is rotationally fixed to said body, said indicator is rotatable with respect to said first sleeve, and said nut is coupled to said indicator so that said nut rotationally drives said indicator with respect to said first sleeve as said nut moves axially with respect to said body.

7. The chuck as in claim 6, wherein said first sleeve is disposed radially outward of said indicator and defines an enclosed opening therethrough and wherein said indicia is aligned with said opening in said first relative position and is misaligned with said opening in said second relative position.

8. The chuck as in claim 7, wherein said indicator includes
   a generally cylindrical second sleeve disposed radially inward of said first sleeve, said second sleeve determining said indicator surface, and
   an elongated finger extending from said second sleeve to said nut parallel to the axis of said axial bore.

9. The chuck as in claim 8, wherein
   said finger defines an elongated channel having a first section parallel to said axis, a second section parallel to said axis and angularly offset from said first section, and a third section angled with respect to said axis and connecting said first section and said second section,
   wherein a pin extends from said nut into said channel so that axial movement of said pin with said nut moves said pin through said channel between said first section and said second section, thereby moving said indicator between said first relative position and said second relative position.

10. A chuck for use with a manual or powered driver having a drive shaft and an elongated tool shaft, said chuck comprising:
    a. a generally cylindrical body having a nose section and a tail section, said tail section being configured to rotate with the drive shaft of the driver and said nose section having an axial bore formed therein;

b. a plurality of jaws disposed radially reciprocally within said body in communication with said bore, each of said jaws having a jaw face formed thereon for engagement with the tool shaft;

c. a first sleeve disposed on said body;

d. a second sleeve rotatably disposed on said body in communication with said jaws so that rotation of said second sleeve moves said jaws toward and away from said axial bore, depending on the direction of said rotation; and e. a visual indicator disposed on said body, wherein one of said first sleeve and said indicator is moveable relative to the other of said first sleeve and said indicator between at least two positions relative to each other, wherein said visual indicator includes a surface on which is defined a visual indicia that is disposed with respect to said first sleeve so that when said indicator and said first sleeve are in a first relative position, said first sleeve exposes said indicia to view outside the chuck and so that when said indicator and said first sleeve are in a second relative position, said first sleeve blocks said indicia from view outside the chuck, and wherein said one of said indicator and said first sleeve is in operative communication with said jaws so that movement of said jaws to a predetermined position moves said one of said indicator and said first sleeve to said first relative position and movement of said jaws out of said predetermined position moves said one of said indicator and said first sleeve to said second relative position.

11. The chuck as in claim 10, including a nut disposed on said body in driving engagement with said jaws so that movement of said nut with respect to said body moves said jaws into and out of said predetermined position, wherein said second sleeve is in driving engagement with said nut so that said second sleeve drives said jaws by said nut, and wherein said nut is in driving communication with one of said first sleeve and said indicator so that said jaws are in said driving communication with one of said first sleeve and said indicator by said nut.

12. The chuck as in claim 11, wherein said nut is axially movable on said body so that axial movement of said nut drives said jaws toward and away from said axial bore.

13. The chuck as in claim 12, wherein said first sleeve is rotationally fixed to said body, said indicator is rotatable with respect to said first sleeve, and said nut is coupled to said indicator so that said nut rotationally drives said indicator with respect to said first sleeve as said nut moves axially with respect to said body.

14. The chuck as in claim 13, wherein said first sleeve is disposed radially outward of said indicator and defines an enclosed opening therethrough and wherein said indicia is aligned with said opening in said first relative position and is misaligned with said opening in said second relative position.

15. The chuck as in claim 14, wherein said indicator includes a generally cylindrical third sleeve disposed radially inward of said first sleeve, said third sleeve defining said indicator surface, and an elongated finger extending from said third sleeve to said nut parallel to the axis of said axial bore and defining an elongated channel having a first section parallel to said axis, a second section parallel to said axis and angularly offset from said first section, and a third section angled with respect to said axis and connecting said first section and said second section, and wherein a pin extends from said nut into said channel so that axial movement of said pin with said nut moves said pin through said channel between said first section and said second section, thereby moving said indicator between said first relative position and said second relative position.

16. A chuck for use with a manual or powered driver having a drive shaft and a tool having an elongated tool shaft, said chuck comprising:

a. a generally cylindrical body having a nose section and a tail section, said tail section being configured to rotate with the drive shaft of the driver and said nose section having an axial bore formed therein;

b. a plurality of jaws disposed radially reciprocally within said body in communication with said bore, each of said jaws having a jaw face formed thereon for engagement with the tool shaft;

c. a nut disposed on said body and in engagement with said jaws so that axial movement of said nut with respect to said body drives said jaws toward or away from said axial bore, depending on the direction of said axial movement;

d. a first sleeve disposed on said body;

e. a visual indicator having a disposition with respect to said first sleeve that is movable between at least two positions, wherein said visual indicator includes a surface on which is defined a visual indicia that is disposed with respect to said first sleeve so that when said indicator is in a first said position, said sleeve blocks said indicia from view outside the chuck and so that when said indicator is in a second said position, said sleeve exposes said indicia to view outside the chuck; and f. a first detent disposed in said body so that said first detent is biased into said axial bore and so that upon insertion of the tool shaft into said bore so that the groove in the tool shaft is aligned with said first detent, said first detent engages the groove and creates a positive axial lock so that the tool shaft cannot be removed until said positive axial lock is released, wherein at least one of said indicator and said first sleeve is coupled to said nut so that axial movement of said nut drives said disposition to said second position when said jaws are in a predetermined position and into said first position when said jaws are out of said predetermined position, and wherein, upon movement of said jaws to said predetermined position, said jaw faces engage flat sides of the tool shaft so as to rotationally retain the tool.

17. The chuck as in claim 16, wherein said first detent includes a first radial bore in said body extending from an outer circumference of said body to an inner circumference of said body.

18. The chuck as in claim 17, wherein said first detent includes a pivotally mounted lever having a first and second end and a spring coupled to said lever, and wherein said spring urges said first end of said lever into said axial bore.

19. The chuck as in claim 18, wherein said first detent includes a cartridge that houses said lever and said spring, and wherein said spring is disposed operatively between said cartridge and said first end of said lever so that said spring biases said first end of said lever into said axial bore.

20. The chuck as in claim 19, wherein said first detent includes a first pin disposed operatively between two walls of said cartridge, and wherein said lever is pivotally mounted to said first pin.

21. The chuck as in claim 20, wherein said first detent includes a second pin disposed operatively between said two walls of said cartridge, and wherein said spring is coupled to said second pin.

22. The chuck as in claim 19, wherein said chuck includes a nose piece axially movably disposed on said nose section of said body and about said lever, said nose piece defining a cam surface proximate said second end of said lever so that upon movement of said nose piece to an axially forward position, said cam surface deflects said second end of said lever against said spring, thereby pivoting said first end of said lever away from the axis of said axial bore and releasing said positive lock from the grove on the tool shaft allowing the tool shaft.

23. The chuck as in claim 16, including a generally cylindrical second sleeve having threads formed on an inner circumferential surface thereof, said second sleeve being rotatably mounted about said body and coupled to said nut so that relative rotation between said nut and said second sleeve moves said jaws towards or away from the axis of said axial bore.

24. The chuck as in claim 23, wherein said second sleeve includes a depression formed between two threads.

25. The chuck as in claim 24, including a second detent disposed in said nut operatively between said second sleeve and said visual indicator.

26. The chuck as in claim 25, wherein said first sleeve defines an enclosed opening therethrough and wherein said indicia is aligned with said opening in said second position and is misaligned with said opening in said first position.

27. The chuck as in claim 26, wherein said visual indicator includes
   a generally cylindrical third sleeve disposed radially inward of said first sleeve, said third sleeve defining said visual indicator surface, and
   an elongated finger extending from said third sleeve to said nut parallel to the axis of said axial bore.

28. The chuck as in claim 27, wherein said finger defines an elongated channel having a first section parallel to said axis, a second section parallel to said axis and angularly offset from said first section, and a third section angled with respect to said axis and connecting said first section and said second section,
   wherein said second detent includes a pin that extends from said nut, through a second radial bore in said nut, into said channel so that axial movement of said pin with said nut moves said pin through said channel between said first section and said second section, thereby moving said indicator between said first relative position and said second relative position.

29. The chuck as in claim 28, wherein said pin drives said indicator to said second relative position when said pin is in said third channel section.

30. The chuck as in claim 29, wherein said second detent includes
   a spring having a first and a second end disposed operatively in said pin, said first end in engagement with an enclosed end of said pin; and
   a ball, wherein said ball is in engagement with said second end of said spring so that said spring biases said ball radially outward from a second end of said pin into communication with said second sleeve.

31. The chuck as in claim 30, wherein engagement of said depression and said ball align said indicia with said opening in said second position.

32. The chuck as in claim 31, wherein said second position define a predetermined diameter between said jaw faces.

33. The chuck as in claim 32, wherein said diameter is approximately 0.25 inches.

* * * * *

UNITED STATES PATENT AND TRADEMARK OFFICE
CERTIFICATE OF CORRECTION

PATENT NO. : 6,834,864 B2
DATED : December 28, 2004
INVENTOR(S) : Samuel G. Girardeau It is certified that error appears in the above-identified patent and that said Letters Patent is hereby corrected as shown below:

Title page,
Item [56], References Cited, U.S. PATENT DOCUMENTS, please delete "5,348,318" and replace with -- 5,348,317 --.

Column 7,
Line 32, please delete the word "released" and replace with -- releases --.

Column 8,
Line 45, please delete the word "determining" and replace with -- defining --.

Signed and Sealed this

Twenty-fourth Day of May, 2005

JON W. DUDAS
*Director of the United States Patent and Trademark Office*